United States Patent [19]

Gellert

[11] Patent Number: 5,118,280
[45] Date of Patent: * Jun. 2, 1992

[54] INJECTION MOLDING APPARATUS WITH INTEGRAL COOLING IN A FORWARD PORTION OF THE NOZZLE

[76] Inventor: Jobst U. Gellert, 7A Prince St., Georgetown, Ontario, Canada, L7G 2X1

[*] Notice: The portion of the term of this patent subsequent to May 14, 2008 has been disclaimed.

[21] Appl. No.: 678,729

[22] Filed: Apr. 1, 1991

[30] Foreign Application Priority Data

Jan. 25, 1991 [CA] Canada ................................ 2034925

[51] Int. Cl.⁵ ............................................. B29C 45/20
[52] U.S. Cl. ................................. 425/549; 264/328.15
[58] Field of Search .............................. 425/547, 549; 264/328.15

[56] References Cited

U.S. PATENT DOCUMENTS

| | | | |
|---|---|---|---|
| 4,622,001 | 11/1986 | Bright et al. | 425/549 |
| 4,687,613 | 8/1987 | Tsutsumi | 425/549 |
| 4,688,622 | 8/1987 | Gellert | 164/61 |
| 4,891,001 | 1/1990 | Gellert | 425/549 |
| 4,911,636 | 3/1990 | Gellert | 425/549 |
| 4,955,804 | 9/1990 | Martell et al. | 425/549 |
| 5,015,170 | 5/1991 | Bellert | 425/549 |

Primary Examiner—Timothy Heitbrink
Attorney, Agent, or Firm—Dalesman & Company

[57] ABSTRACT

Injection molding apparatus with integral heating and cooling in the forward portion of a nozzle adjacent the gate. Cooling fluid tubes extend to the forward portion of the nozzle through a surrounding insulative air space which reduces problems of thermal expansion and contraction. A split seating ring is seated in the cavity plate and extends across the insulative air space to receive the nozzle. The seating ring has an outer opening for the cooling fluid tubes to pass therethrough.

4 Claims, 3 Drawing Sheets

INJECTION MOLDING APPARATUS WITH INTEGRAL COOLING IN A FORWARD PORTION OF THE NOZZLE

BACKGROUND OF THE INVENTION

This invention relates generally to injection molding and more particularly to injection molding apparatus with integral cooling in a forward portion of the nozzle.

As is well known, the thermal characteristics of a hot runner injection molding system or apparatus is critical to its successful operation. This is particularly true with the increasing use of more temperature critical materials and even more particularly true for temperature assisted or thermal gating. Nozzles having integral electrically insulated heating elements are also known and a recent example is shown in the applicant's Canadian patent application serial no. 2,030,286 filed Nov. 19, 1990 entitled "Injection Molding Nozzle Having Tapered Heating Element Adjacent the Bore."

More recently, improved temperature control has been achieved by providing cooling around the forward end of the nozzle. Examples of this are shown in U.S. Pat. No. 4,622,001 to Bright et al which issued Nov. 11, 1986, the applicant's U.S. Pat. No. 4,911,636 which issued Mar, 27, 1990, Mold-Masters Limited Canadian patent application serial number 606,082 filed Dec. 5, 1988 entitled "Injection Molding System Having Fluid Cooled Inserts", and the applicant's Canadian patent application serial no. 2,022,120 filed Jul. 27, 1990 entitled "Injection Molding Cooled Socket Holder for a Heated Nozzle." However these arrangements all have the disadvantage that an additional insert or member is required to provide the cooling around the nozzle. U.S. Pat. No. 4,687,613 to Tsutsumi which issued Aug. 18, 1987 does show a type of nozzle with integral heating and cooling. However, in addition to being very difficult if not impossible to manufacture, this arrangement has the disadvantage that the integral cooling fluid passages run from near the rear end to near the forward end. This causes problems of excessive thermal expansion and contraction, particularly for temperature assisted or thermal gating applications.

SUMMARY OF THE INVENTION

Accordingly, it is an object of the present invention to at least partially overcome the disadvantages of the prior art by providing injection molding apparatus wherein the nozzle has integral cooling in its forward portion with external cooling fluid inlet and outlet tubes extending through an insulative air space around the nozzle.

To this end, in one of its aspects, the invention provides an injection molding apparatus having a nozzle received in a well in a cavity plate with an insulative air space provided therebetween, the nozzle having a central portion extending between a rear portion adjacent a rear end and a forward portion adjacent a forward end with a central melt bore extending therethrough from the rear end to the forward end, the nozzle having an integral electrically insulated heating element, the heating element having a forward portion extending around the melt bore in the forward portion of the nozzle, the nozzle having a cooling fluid passage extending substantially around the melt bore in the forward portion of the nozzle, having the improvement wherein the forward portion of the nozzle has an inlet duct and an outlet duct which extend to the cooling fluid passage, and cooling fluid inlet and outlet tubes extend through the air space between the nozzle and the surrounding cavity plate to the respective inlet duct and outlet duct in the forward portion of the nozzle to provide a flow of cooling fluid through the cooling fluid passage.

Further objects and advantages of the invention will appear from the following description taken together with the accompanying drawings.

DETAILED DESCRIPTION OF THE INVENTION

Figure 1:
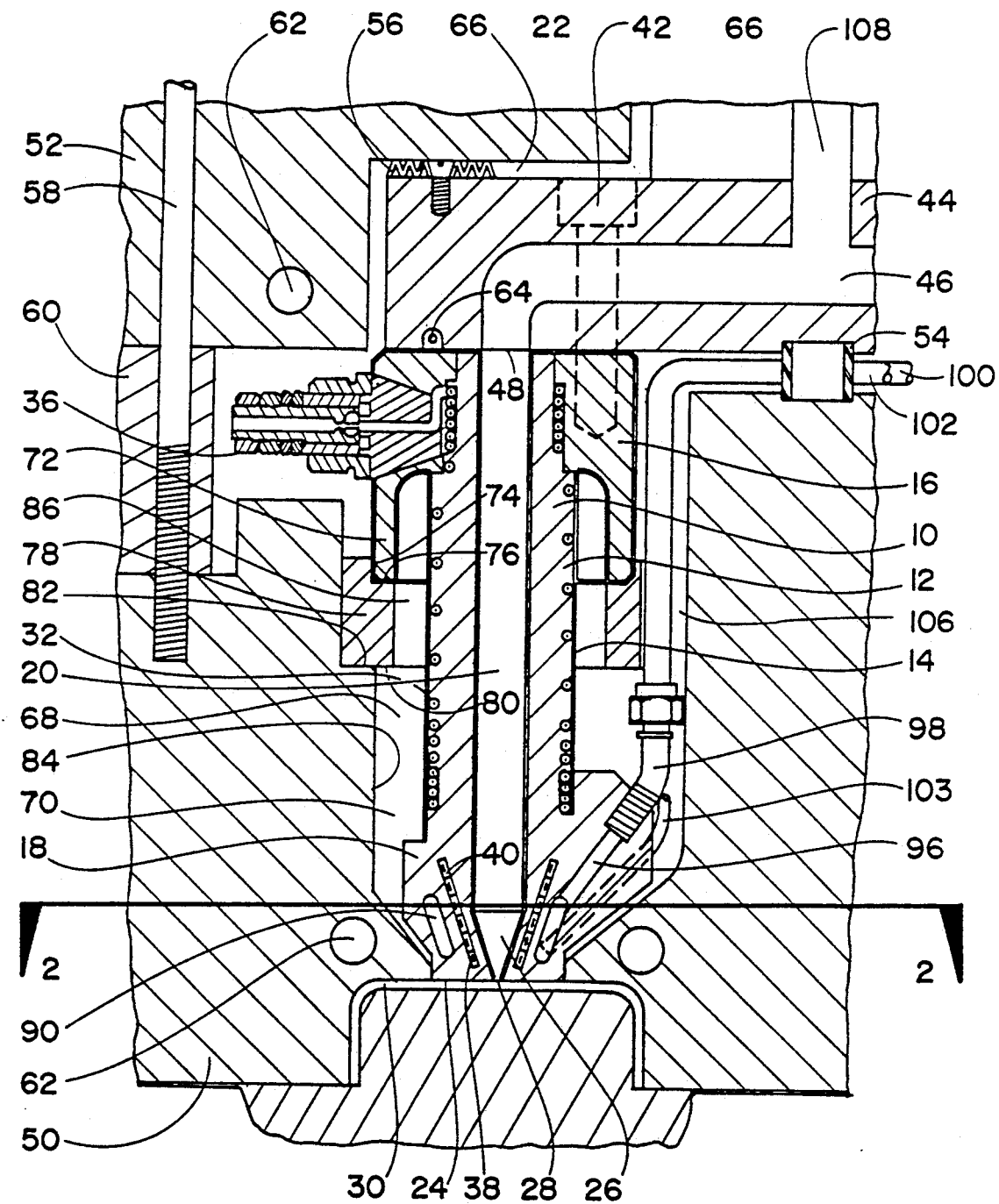
FIG. 1 is a sectional view of a portion of a multi-cavity injection molding system or apparatus showing a preferred embodiment of the invention.

Reference is first made to FIG. 1 which shows one nozzle 10 of a number of nozzles in a multi-cavity injection molding system. Each nozzle 10 has a central portion 12 with a cylindrical outer surface 14 which extends between a rear portion 16 and a forward portion 18. These portions are made of steel and are integrally brazed together essentially as described in the applicant's Canadian patent application serial no. 2,030,286 filed Nov. 19, 1990 referred to above. A central melt bore 20 extends through the nozzle 10 from a rear end 22 to a forward end 24. The melt bore 20 has a portion 26 which tapers to a gate 28 leading to a cavity 30.

The nozzle 10 is heated by an integral electrically insulated heating element 32. The heating element 32 has a rear portion 34 which extends outwardly to a cold terminal 36 and a forward portion 38 which extends around the melt bore 20 in the forward portion 18 of the nozzle 10. In this embodiment, the forward portion 38 of the heating element 32 is tapered with a number of adjacent coils 40 having a generally uniform rectangular cross section and is also made as described in the applicant's Canadian patent application serial number 2,030,286 filed Nov. 19, 1990 mentioned above.

The nozzles 10 are secured by bolts 42 to a common elongated melt distribution manifold 44 which has a melt passage 46 which branches to a number of outlets 48, each of which is aligned with the central melt bore 2 through one of the nozzles 10. The manifold 44 is located securely in place between a cavity plate 50 and a back plate 52 by a central locating ring 54 and a resilient spacer member 56. The back plate 52 is held in place by bolts 58 which extend through a support plate 60 into the cavity plate 50. The cavity plate 50 and back plate 52 are cooled by pumping cooling water through cooling conduits 62. The manifold 44 is heated by an electric heating element 64 which is cast into it as described in the applicant's U.S. Pat. No. 4,688,622 which issued Aug. 25, 1987. The locating ring 54 and spacer member 56 provide insulative air spaces 66 between the heated manifold 44 and the cooled cavity plate 50 and back plate 52.

Figure 3:
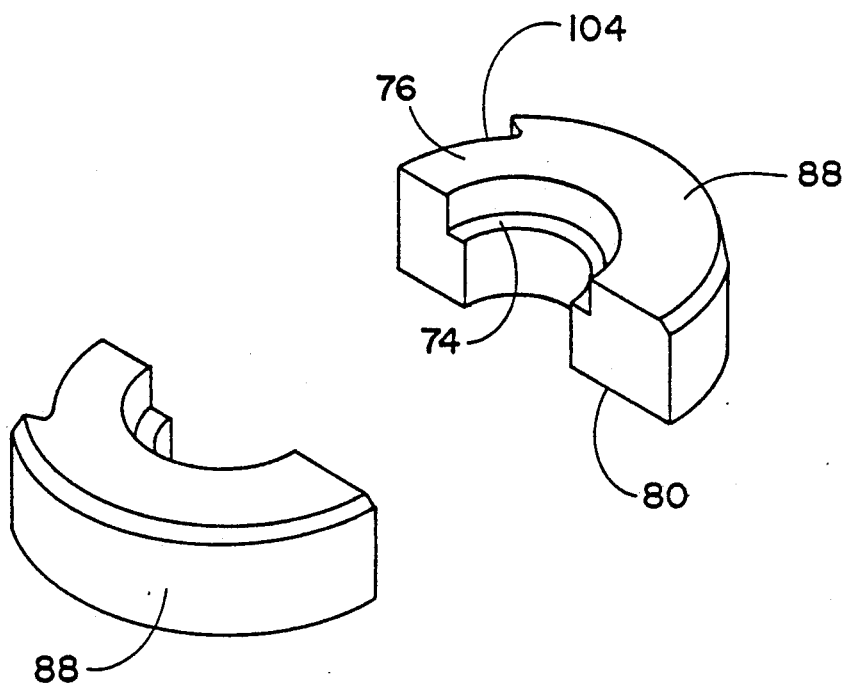
FIG. 3 is an isometric view of the seating ring seen in FIG. 1.

The heated nozzle 10 is seated in a well 68 in the cooled cavity plate 50 with an air space 70 between them to provide thermal insulation. In this embodiment, the rear portion 16 of the nozzle 10 has a circumferential insulation flange 72 which is received in a seat 74 in the rear surface 76 of a circular seating ring 78. The seating ring 78 in turn, has a forward surface 80 which is seated against an inwardly extending shoulder 82 in the wall 84 of the well 68 in the cavity plate 50. The seating ring 76 has a central opening 86 therethrough to receive the central portion 12 of the nozzle 10 therethrough with provision for the insulative air space 66. As best seen in FIG. 3, the seating ring 78 is a split ring with two separate parts 88 which fit together around the central portion 12 of the nozzle 10 between the larger diameter rear and forward portions 16, 18.

Figure 2:
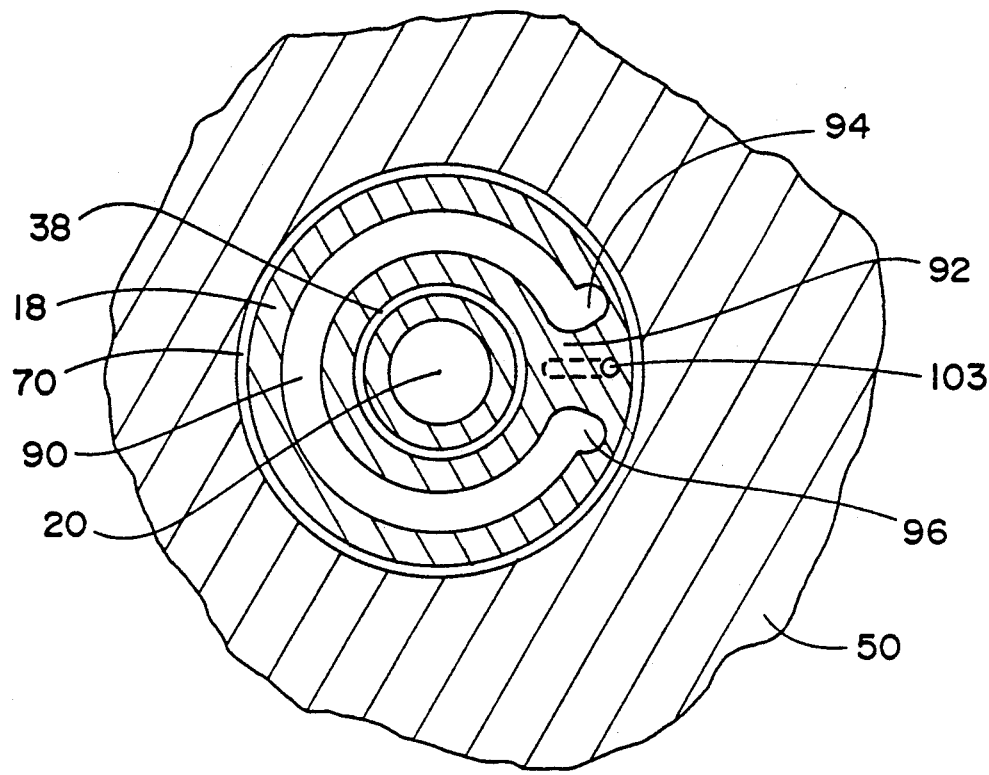
FIG. 2 is a cross sectional view along line 2—2 in FIG. 1.

As seen in FIGS. 1 and 2, the forward portion 18 of the nozzle 10 has a circular cooling fluid passage 90 which extends around the central melt bore 20 except for a narrow baffle portion 92. The forward portion 18 of the nozzle 10 has inlet and outlet ducts 94, 96 which extend to the circular cooling fluid passage 90 on opposite sides of the baffle portion 92. The inlet and outlet ducts 94, 96 are threaded to respectively receive connectors 98 from copper cooling fluid inlet and outlet tubes 100, 102 which extend through the air space 70 to a controlled source (not shown) of cooling fluid, such as water. The inlet and outlet tubes 100, 102 pass through an outer opening 104 in the seating ring 78 and outside the rear portion 16 of the nozzle 10. In this embodiment, the wall 84 of the well 68 is machined with a longitudinal groove 106 to partially receive the inlet and outlet tubes 100, 102 to provide clearance past the rear portion 16 of the nozzle 10. A thermocouple 103 also extends through the air space 70 and the outer opening 104 in the seating ring 78 into the baffle portion 92 of the forward portion 18 of the nozzle 10 to monitor operating temperature during use.

In use, the system is assembled as shown in FIG. 1 and electrical power is applied to the heating element 32 of each nozzle 10 and the heating element 64 in the manifold 44 to heat them to a predetermined operating temperature depending on the material being molded. In order to provide thermal or temperature assisted gating, power to the heating elements 32 and the flow of cooling fluid through the cooling fluid passages are controlled in conjunction with a cycle of injecting pressurized melt from a molding machine (not shown) into the melt passage 46 through an inlet 108. The heat is switched off and the cooling turned on to freeze the gates shortly before the mold is opened for ejection. As the mold is closed following ejection, the cooling is switched off and power is reapplied to the heating elements 32 to heat the solidified melt in the gates 28 so they reopen immediately when injection pressure is reapplied. The pressurized melt flows through the melt passage 46 and the gate 28 in each nozzle 10 and fills the cavities 30. After the cavities are filled, injection pressure is held momentarily to pack and then released. After a short cooling period, the mold is opened again to eject the molded products. This cycle is repeated continuously with a frequency dependent on the size and shape of the cavities and the type of material being molded.

Figure 4:
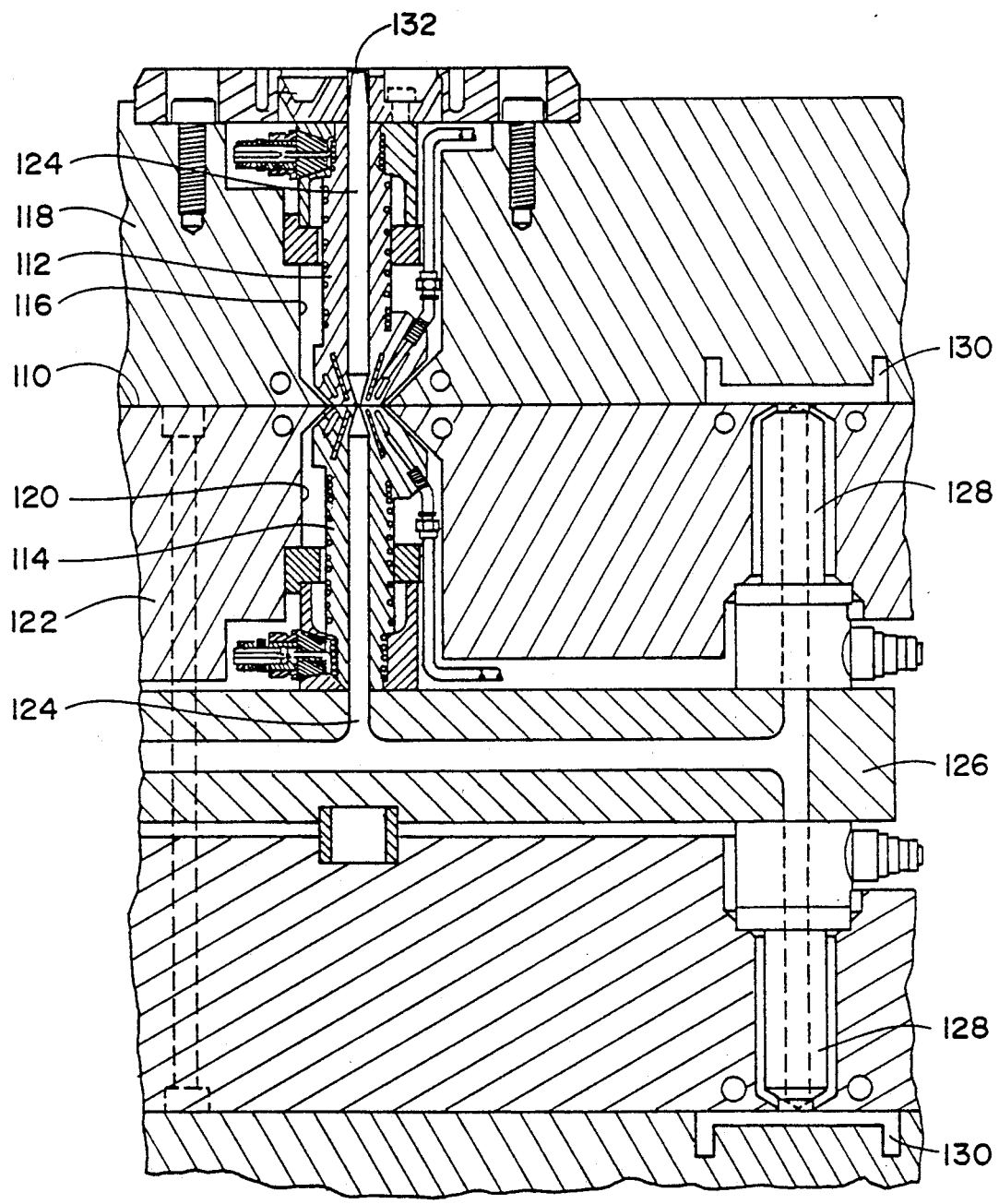
FIG. 4 is a sectional view showing a different application of the invention.

Reference is now made to FIG. 4 which illustrates a stack molding configuration for conveying melt across a parting line 110. This configuration is similar to that shown in the applicant's U.S. Pat. No. 4,891,001 which issued Jan. 2, 1990 except that the upstream and downstream nozzles 112, 114 have provision for controlled heating and cooling in their forward portions the same as described above in regard to FIGS. 1-3. The upstream nozzle 112 is seated in a well 116 in a fixed mold platen 118, while the downstream nozzle 114 is seated in a well 120 in a movable mold platen 122. After passing through the upstream and downstream nozzles 112, 114, the melt passage 124 branches out in a distribution manifold 126 in the moveable mold platen, 122 to convey melt through a number of other nozzles 128 to cavities 130. As the configuration of the upstream and downstream nozzles 112, 114 are the same as described above, it need not be repeated.

In use, the system is assembled as shown and heating and cooling is applied to the upstream and downstream nozzles 112, 114 according to a predetermined cycle in accordance with a cycle of injecting pressurized melt from a molding machine (not shown) into the melt passage 124 through an inlet 132. When the mold is in the closed position shown, heating is switched on and cooling turned off to the upstream and downstream nozzles 112, 114, and the pressurized melt flows from the upstream nozzle 112 to the downstream nozzle 114 across the parting line 110 and through the melt passage 124 to the various cavities 130. After the cavities 130 are filled, the heat is switched off and cooling is turned on shortly before the mold is opened for ejection After ejection, the mold is closed again and this cycle is repeated continuously. The use of controlled heating and cooling in the forward portion of the upstream and downstream nozzles 112, 114 reduces cycle time and improves the operation of the system.

While the description of the apparatus which provides integral cooling in the forward portion of a nozzle, it is not to be construed in a limiting sense. Variations and modifications will readily occur to those skilled in the art. For instance, the size and shape of the nozzle 10 and the seating ring 78 can be different for different applications. The size and shape of the cooling fluid passage 90, baffle portion 92 and inlet and outlet ducts 94, 96 in the forward portion 18 of the nozzle can also vary considerably. The operating cycle can vary by controlling heating and/or cooling to the nozzles at different times. Cooling can be controlled by merely turning off the flow of cooling water through the cooling fluid passage 90 or by purging the water. Reference is made to the appended claims for a definition of the invention.

The embodiments of the invention in which an exclusive property or privilege is claimed are defined as follows:

1. In an injection molding apparatus having a nozzle received in a well in a cavity plate with an insulative air space provided therebetween, the nozzle having a rear end, a forward end, and a central portion extending between a rear portion adjacent the rear end and a forward portion adjacent the forward end with a central melt bore extending therethrough from the rear end to the forward end, the nozzle having an integral electrically insulated heating element, the heating element having a forward portion extending around the melt bore in the forward portion of the nozzle, the nozzle having a cooling fluid passage extending substantially around the melt bore in the forward portion of the nozzle, the improvement wherein;

the forward portion of the nozzle has an inlet duct and an outlet duct which extend to the cooling fluid passage, and cooling fluid inlet and outlet tubes extend through the air space between the nozzle and the surrounding cavity plate to the respective inlet duct and outlet duct in the forward portion of the nozzle to provide a flow of cooling fluid through the cooling fluid passage.

2. An injection molding apparatus as claimed in claim 1 wherein the well in the cavity plate has a wall with an inwardly extending shoulder, the central portion of the nozzle extends through a central opening in a seating ring, the seating ring having a forward surface and a rear surface, the forward surface being seated against the inwardly extending shoulder in the wall of the well in the cavity plate, the rear surface of the seating ring forming a seat which receives the rear portion of the nozzle, the seating ring having an outer opening through which the cooling fluid tubes extend.

3. An injection molding apparatus as claimed in claim 2 wherein the seating ring is a split ring.

4. An injection molding apparatus as claimed in claim 3 wherein the cooling fluid passage in the forward portion of the nozzle extends around outside the forward portion of the heating element.

* * * * *